United States Patent [19]
Nakashima

[11] Patent Number: 5,237,747
[45] Date of Patent: Aug. 24, 1993

[54] ROLL MEMBER HAVING GLASS SURFACE AND METHOD FOR MANUFACTURING SAME

[75] Inventor: Mikio Nakashima, Owariasahi, Japan

[73] Assignee: Kabushiki Kaisha Nakashima, Yokohama, Japan

[21] Appl. No.: 732,874

[22] Filed: Jul. 19, 1991

[30] Foreign Application Priority Data

Aug. 10, 1990 [JP] Japan .................. 2-213082

[51] Int. Cl.$^5$ ............................ B23P 17/00
[52] U.S. Cl. .................. 29/895.32; 29/895.3; 492/53
[58] Field of Search ............. 29/895.3, 895.32, 895.33, 29/895.21, 895.212, 132, 130, DIG. 39; 427/34, 380, 427, 405

[56] References Cited

U.S. PATENT DOCUMENTS

| | | | |
|---|---|---|---|
| 3,156,033 | 11/1964 | Brown | 29/895.32 |
| 3,815,197 | 6/1974 | Sukenik | 29/132 |
| 4,003,770 | 1/1977 | Janowiecki et al. | 427/34 X |
| 4,526,839 | 7/1985 | Herman et al. | 29/DIG. 39 X |
| 4,571,798 | 2/1986 | Adams | 29/132 X |
| 4,912,835 | 4/1990 | Harada et al. | 29/132 |
| 4,951,392 | 8/1990 | Miihkinen | 29/130 X |
| 5,023,985 | 6/1991 | Salo et al. | 29/130 X |
| 5,077,132 | 12/1991 | Maruno et al. | 427/380 X |

FOREIGN PATENT DOCUMENTS 0167007 10/1983 Japan ..................... 29/132

*Primary Examiner*—Timothy V. Eley
*Assistant Examiner*—C. Richard Martin
*Attorney, Agent, or Firm*—Armstrong, Nikaido, Marmelstein, Kubovcik & Murray

[57] ABSTRACT

A roll member of metal body is coated with a smooth glass layer sprayed thereon. The invention is also directed to a method for manufacturing a roll member of metal body having a glass surface, including preheating the surface of the metal body which is subject to a blast treatment to 200°~600° C. with or without a stainless undercoat layer on the blast-treatment surface, spraying a glass material onto the surface of the metal body, and grinding the sprayed glass surface to form a smooth surface.

2 Claims, 1 Drawing Sheet

ROLL MEMBER HAVING GLASS SURFACE AND METHOD FOR MANUFACTURING SAME

BACKGROUND OF THE INVENTION

1. Field of the Invention

The present invention relates to a roll member having a glass surface and a method for manufacturing the same.

2. Description of Related Art

A method roll member has been used for example as a printing roll or a paper manufacturing or iron manufacturing roll for industrial use. However, a known metal roll member tends to be deteriorated by corrosion due to aging, since the roll member comes into contact with a cleaning acid or alkaline liquid, a printing ink, a paper product or a metal product. Furthermore, such a roll member is often used in a severe environment, such as high temperature and high humidity, so that the deterioration of the surface of the roll member is accelerated due to a production of a spot thereon or a foreign matter stuck thereto, thus resulting in a decreased durability.

In addition, in case of a guide roll which is commonly used to guide an article or a product, it is preferable to provide an electrical insulation thereto, since such a guide roll is usually used with an electronic equipment. It is also desirable that no foreign matter (dust, etc.) tends to stick to the surface of the roll member. Even if a foreign matter sticks to the surface of the roll member, the foreign matter must be easily removed therefrom.

SUMMARY OF THE INVENTION

The primary object of the present invention is to provide a roll member to which no foreign matter tends to stick and wherein even if a foreign matter sticks to the surface of the roll member, the foreign matter can be easily removed.

Another object of the present invention is to provide a roll member which has a good electrical insulation, an increased chemical durability, such as acid-resistance and alkali-resistance, and a long service life.

The present invention is also directed to a method for effectively manufacturing such a roll member.

To achieve the object mentioned above, according to an aspect of the present invention, there is provided a roll member having a metal body which is coated with a smooth glassy surface layer sprayed on the surface of the metal body.

According to another aspect of the present invention, there is provided a method for manufacturing a roll member having a metal body which is provided with a glassy surface, comprising preheating the surface of the metal body which has been subject to a blast treating to 200°~600° C. with or without a stainless undercoat layer on the blast-treated surface, spraying a glass material onto the surface of the metal body in a plasma spraying method to form a glass coating thereon, and grinding the glass coating to form a smooth glassy surface after cooling the same.

BRIEF DESCRIPTION OF THE DRAWINGS

The invention will be described below in detail with reference to the accompanying drawings, in which.

DESCRIPTION OF THE PREFERRED EMBODIMENTS

Figure 1:
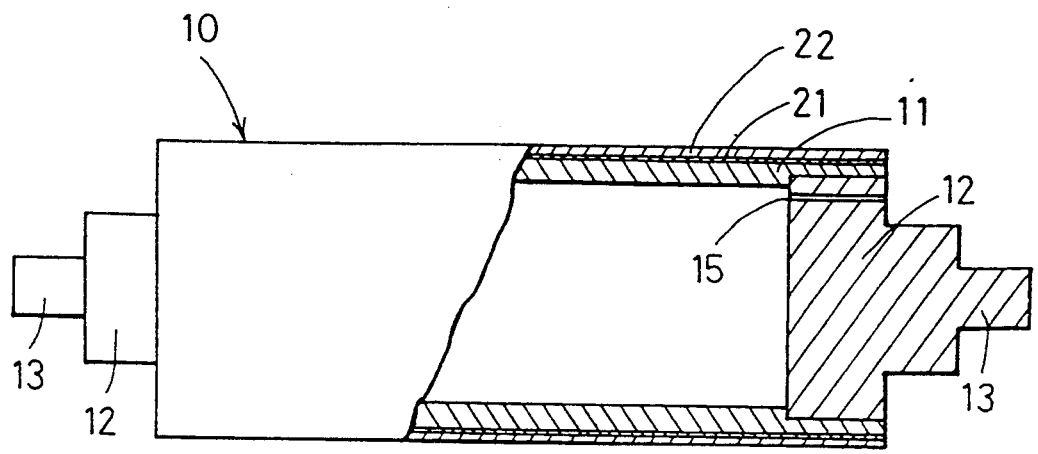
FIG. 1 is a partially broken longitudinal sectional view of a roll member according to the present invention; and, FIG. 2 is a partial enlarged view of a roll member shown in FIG. 1.

A roll member 10 shown in FIG. 1 is used as a printing roll and is comprised of a cylindrical body 11 of metal, such as steel and end member 12, 12 located at opposite ends of the cylindrical body 11 to close the open ends thereof. The end members 12 have shaft portions 13 for rotation and through holes 15 through which a high temperature gas which is produced within the roll member in the course of the spraying can be discharged.

Figure 2:
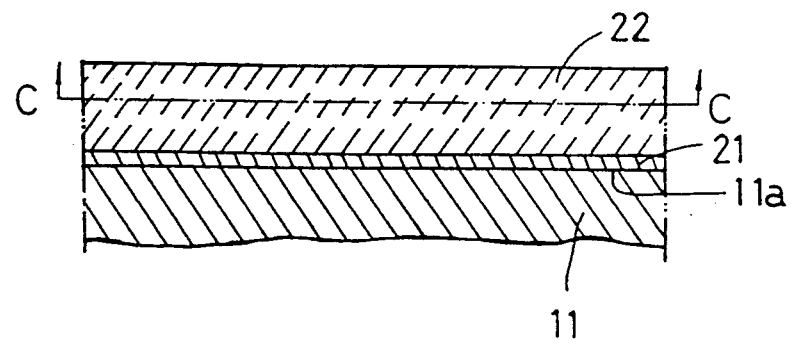

As can be seen in FIGS. 1 and 2, the roll member 10 of the present invention is coated with a smooth glass layer 22 sprayed on the roll surface of the metal body 11. In FIG. 2, numeral 11a designates a blast treatment surface formed on the roll surface of the cylindrical body 11, and 21 an undercoat layer of a stainless material sprayed on the blast treatment surface 11a.

The following discussion will be directed to a method for manufacturing a roll member, as mentioned above.

There are two kinds of roll members, one of which is a "hard type" roll member which has a high commercial durability, such as acid-resistance or alkali-resistance, and the other is a "standard type" roll member which has a lesser chemical durability than the hard type, depending on the usage thereof. The main difference between the hard type roll member and the standard type roll member resides in composition of the spraying glass material, as shown in Table 1 below. There is also a slight difference in the manufacturing process between the hard type roll member and the standard type roll member.

TABLE 1

|  | Hard Type | Standard Type |
|---|---|---|
| (A) a primary processing step of the surface of the metal body | 1. steel grid blast 2. stainless steel (undercoat) spraying | — — |
| (B) preheating | about 400~600° C. | about 200~400° C. |
| (C) glass spraying | plasma spraying of glass material | |
| (D) cooling ( ) | cooling apparatus (about 100~200° C./hr) | natural cooling |
| (E) grinding | smooth surface (or smooth surface as glass) grinding | |

( ) It is preferable to carry out by a cooling apparatus (about 50° C./hr) when the roll member has a complex shape and different thickness.

Basically, the manufacturing process of each roll member having a glassy surface according to the present invention comprises (A) a primary processing step of the surface of the metal body→(B) a preheating step→(C) a glass spraying step→(D) a cooling step→(E) a grinding step.

Each step will be discussed below.

(A) primary processing step of the cylindrical body (A-1) blast treatment

The surface of the roll member (cylindrical body) on which a sprayed glass layer is to be formed is subjected to an undercoat treatment, such as a known steel grid blast, etc. In the illustrated embodiment, 44~104μ of steel grid was used.

(A-2) formation of undercoat layer

An undercoat layer is formed on the blast treatment surface in accordance with need. Note that it is preferable to provide the undercoat layer especially in case of a hard type roll member.

The undercoat layer is usually and advantageously formed by a stainless-spraying. The undercoat layer prevents a formation of FeO on the outer surface of the cylindrical body so that a glass layer sprayed thereon later can be firmly bonded to the cylindrical body.

In the illustrated embodiment, an undercoat layer of "stainless 316" having about 80~250μ thickness was formed. It is possible to use an alloy, for example "HASTELOY" (trade name), containing Ni, Cr and Co, etc., in place of the stainless 316.

The spraying conditions are as follows.

Plasma spraying apparatus: "Plazjet-II 200" produced by Plazjet Inc.
Spraying circumferential speed V: 30 m/min.
Pitch P: 20 mm/rpm
Spraying distance D: 200 mm
Plasma gas: $N_2$ (nitrogen) 300 L/min. Ar (argon) 70 L/min.
Plasma current: 450 A
Plasma voltage: 390 V

(B) Preheating

Thereafter, the surface of the cylindrical body is preheated to about 200°~600° C. The preheating temperature depends on the spraying glass material and is usually about 400°~600° C. for the hard type and about 200° C. for the standard type. The preheating is effected as follows by the spraying apparatus. Alternatively, the preheating can be effected also by a furnace.

The following is an example of preheating conditions for the hard type roll member, using a spraying apparatus.

Plasma spraying apparatus: Same as above
Number of preheating steps: 4 passes (400°~600° C.)
Spraying circumferential speed V: 30 m/min.
Number of revolution: 91 rpm
Spraying distance D: 140 m
Plasma gas: $N_2$ (nitrogen) 300 L/min.
H (hydrogen) 120 L/min.
Plasma current: 450 A
Plasma voltage: 395 V

(C) Glass spraying

A spraying glass material is sprayed on the surface of the cylindrical body after preheating the latter by the spraying apparatus. The spraying glass material used in the present invention is made of a powdered material which can form a glass coating layer when sprayed and is for example a powdered glass, a raw glass material, frit or raw frit material, or the like. In the present invention, preferably, the frit which is partly or entirely molten is used. It is also advantageous to use a powdered mixture in which only a water-soluble raw material constitutes a water-non soluble frit and the remainder is used as it is.

The protection coating layer (glass layer) thus obtained can be easily colored by adding metal oxide or pigment to the spraying glass material.

The composition (%) of the spraying glass material (frit) used in the embodiment of the invention is shown in Table 2 (hard type) and Table 3 (standard type).

In Table 2, the materials represented by No. 1 through No. 13 are those of acid-resistance and alkali-resistance which are not reactive to solution of PH 1~3 or PH 12~14. Generally speaking, if more than 65% of $SiO_2$ is contained in the solution, the solution exhibits acid-resisting and alkali-resisting properties (chemical durability).

The following is an example of spraying conditions.
Spraying glass material used: Hard type No. 1 (Table 2)
Composition (%):

| | |
|---|---|
| $SiO_2$: | 66 |
| $B_2O_3$: | 9 |
| $Al_2O_3$: | 4 |
| $Li_2O$: | 16 |
| CaO: | 1 |
| ZnO: | 0.5 |
| $ZrO_2$: | 1.5 |
| SrO: | 2 |

Spraying apparatus: Same as above
Spraying circumferential speed V: 30 m/min.
Pitch P: 5 mm
Spraying distance D: 210 mm
Amount of spraying material kg/hr: 4 kg

| Number of passes | N | H | A (current) | V (voltage) |
|---|---|---|---|---|
| 1 | 300 | 130 | 450 | 398 |
| 2 | ↓ | 120 | ↓ | 392 |
| 3 | ↓ | 100 | ↓ | 383 |
| 4 | ↓ | 70 | ↓ | 375 |
| 5 | ↓ | 70 | ↓ | 369 |
| 6 | ↓ | 70 | ↓ | ↓ |
| 7 | ↓ | 70 | ↓ | ↓ |
| 8 | ↓ | 70 | ↓ | ↓ |

Under the above conditions, 1.4 mm thickness of the sprayed glass layer was obtained.

(D) Cooling

The roll member is cooled after the glass spraying. The cooling can be a natural cooling but is preferably carried out by a cooling apparatus particularly when the roll member has a complex shape and different thicknesses. In particular, the hard type roll member should be gradually cooled by a cooling apparatus. As a cooling apparatus can be used a known cooling furnace by which the roll member is cooled at a cooling efficiency of 50°~200° C./hr.

(E) Grinding

After cooling, the roll surface is ground to provide a smooth outer surface. The grinding can be effected by a known diamond grinder. In an example, 0.4~0.7 mm of the upper surface of the sprayed glass layer of 1.4 mm thickness was removed by the diamond grinder, so that a smooth glass layer of 0.7~1.0 mm was obtained. Note C—C in FIG. 2 designates the grinding line upto which the upper surface of the glass layer is to be ground.

TABLE 2

| | Hard Type (acid resistance, alkali resistance) | | | | | | |
|---|---|---|---|---|---|---|---|
| No. | 1 | 2 | 3 | 4 | 5 | 6 | 7 |
| $SiO_2$ | 66 | 66 | 67 | 66 | 67 | 65 | 68 |
| $Na_2O$ | | | | | | | |
| $K_2O$ | | | | | | | |
| $B_2O$ | 9 | 9 | 7 | 8 | 6 | 9 | 7 |
| $Al_2O$ | 4 | 4 | 5 | 5 | 5 | 5 | 4 |

TABLE 2-continued

| Hard Type (acid resistance, alkali resistance) | | | | | | | |
| --- | --- | --- | --- | --- | --- | --- | --- |
| Li$_2$O | 16 | 16 | 16 | 16 | 16 | 16 | 16 |
| CaO | 1 | 1 | 1 | 1 | 1 | | 1 |
| PbO | | | | | | | |
| TiO$_2$ | | 1 | | | | | 1 |
| MgO | | | | | | | |
| ZnO | 0.5 | 0.5 | 0.5 | 0.5 | 0.5 | 1 | |
| ZrO$_2$ | 1.5 | 0.5 | 1.5 | 1.5 | 2 | 2 | 1 |
| SnO$_2$ | | | | | | | |
| SrO | 2 | 2 | 2 | 2 | 2.5 | 2 | 2 |
| BaO | | | | | | | |
| Note | | | | | | | |
| 3α × 10$^{-8}$ | 370.8 | 372.6 | 376.4 | 375.7 | 377.3 | 371.9 | 374.3 |

| No. | 8 | 9 | 10 | 11 | 12 | 13 |
| --- | --- | --- | --- | --- | --- | --- |
| SiO$_2$ | 68 | 69 | 70 | 71 | 72 | 73 |
| Na$_2$O | | | | | | |
| K$_2$O | | | | | | |
| B$_2$O | 6 | 6 | 7 | 8 | 8 | 8 |
| Al$_2$O | 4 | 3 | 2 | 1 | 1 | 1 |
| Li$_2$O | 16 | 16 | 16 | 16 | 16 | 16 |
| CaO | 1 | 1 | 2 | 2 | 1 | |
| PbO | | | | | | |
| TiO$_2$ | 1 | 1 | | | | |
| MgO | | | | | | |
| ZnO$_2$ | | | | | | |
| ZrO$_2$ | 1 | 1 | 1 | | | |
| SnO$_2$ | 1 | 1 | | | | |
| SrO | 2 | 2 | 2 | 2 | 2 | 2 |
| BaO | | | | | | |
| Note | | | | | | |
| 3α × 10$^{-8}$ | 376.2 | 372.0 | 366.8 | 360.6 | 354.4 | 352.2 |

TABLE 3

| Standard Type | | | | | | | | | | | | | | | |
| --- | --- | --- | --- | --- | --- | --- | --- | --- | --- | --- | --- | --- | --- | --- | --- |
| No. | 17 | 18 | 19 | 20 | 21 | 22 | 23 | 24 | 25 | 26 | 27 | 28 | 29 | 30 | 31 |
| SiO$_2$ | 45 | 40 | 45 | 48 | 40 | 64 | 45 | 34 | 31 | 38 | 34 | 36 | 38 | 40 | 40 |
| Na$_2$O | | | | | | | | | | | | | 9 | | |
| K$_2$O | | | | | | | | | | | | | 7 | 5 | |
| B$_2$O | 18 | 18 | 19 | 16 | 16 | 10 | 19 | 17 | 17 | 17 | 20 | 13 | 17 | 20 | 26 |
| Al$_2$O | 3 | 2 | 3 | 3 | 2 | 4 | 3 | 3 | 3 | 2 | 2 | 5 | 2 | 3 | 2 |
| Li$_2$O | 16 | 16 | 17 | 16 | 16 | 16 | 17 | 16 | 16 | 16 | 17 | 7 | 9 | 16 | 18 |
| CaO | 4 | 3 | 3 | 3 | 2 | 1 | 3 | 3 | 4 | 3 | 2 | 6 | 4 | 4 | 4 |
| PbO | | | | | | | | | | | | | | | |
| TiO$_2$ | 2 | | 2 | 2 | | 1 | 2 | | | | | 2 | 2 | 2 | 1 |
| MgO | 2 | 1 | 1 | 1 | 2 | 0.5 | 1 | 1 | 2 | 2 | 2 | 2 | 2 | 2 | 1 |
| ZnO | 2 | 2 | 2 | 2 | 2 | 1 | 2 | 1 | 1 | 2 | 2 | 3 | 2 | 2 | 2 |
| ZrO$_2$ | 2 | 12 | 1 | 2 | 12 | 1 | 1 | 18 | 18 | 13 | 13 | 2 | 1 | 2 | |
| SnO$_2$ | | | 1 | 1 | 2 | 0.5 | 1 | 1 | 2 | 1 | 2 | 3 | 1 | 2 | |
| SrO | 4 | 4 | 4 | 4 | 4 | 2 | 4 | 4 | 4 | 4 | 4 | 4 | 4 | 4 | 4 |
| BaO | 2 | 2 | 2 | 2 | 2 | | 2 | 2 | 2 | 2 | 2 | 1 | 2 | 2 | 2 |
| Note | | | white | | | white | | | white | white | white | white | | | |
| 3α × 10$^{-8}$ | 383.0 | 381.7 | 399.9 | 382.1 | 380.6 | 374.3 | 399.9 | 394.6 | 399.3 | 384.2 | 396.9 | 387.6 | 394.7 | 383.2 | 402.4 |

| No. | 32 | 33 | 34 | 35 | 36 | 37 | 38 | 39 | 40 | 41 | 42 | 43 | 44 | 45 | 46 |
| --- | --- | --- | --- | --- | --- | --- | --- | --- | --- | --- | --- | --- | --- | --- | --- |
| SiO$_2$ | 40 | 45 | 46 | 48 | 50 | 53 | 55 | 58 | 60 | 63 | 60 | 61 | 41 | 40 | 40 |
| Na$_2$O | 3 | | | | | | | | | | | | 4 | 2 | 3 |
| K$_2$O | 1 | | | | | | | | | | | | 3 | 1 | 0 |
| B$_2$O | 20 | 18 | 17 | 18 | 17 | 16 | 15 | 12 | 11 | 11 | 11 | 11 | 16 | 20 | 22 |
| Al$_2$O | 3 | 5 | 5 | 4 | 4 | 3 | 3 | 3 | 3 | 4 | 3 | 3 | 3 | 2 | 4 |
| Li$_2$O | 15 | 16 | 16 | 16 | 16 | 16 | 16 | 16 | 16 | 15 | 17 | 15 | 13 | 15 | 14 |
| CaO | 4 | 4 | 5 | 4 | 3 | 3 | 3 | 4 | 4 | 2 | 2 | 2 | 4 | 3 | 3 |
| PbO | | | | | | | | | | | | | | | |
| TiO$_2$ | 2 | 1 | 1 | | 1 | 1 | 1 | 1 | | 1 | 1 | | 2 | 1 | 1 |
| MgO | 2 | 1 | 1 | | | | | | | | | 2 | 2 | 3 | 3 |
| ZnO | 2 | 1 | 1 | 1 | 1 | 1 | 1 | 1 | 1 | 2 | 1 | 1 | 2 | 3 | 3 |
| ZrO$_2$ | 1 | 2 | 2 | 2 | 2 | 1 | 1 | 1 | 1 | | 1 | 1 | 2 | 2 | 1 |
| SnO$_2$ | 1 | 1 | | 1 | 1 | 1 | 1 | 2 | 1 | | 1 | 1 | 3 | 1 | 1 |
| SrO | 4 | 4 | 4 | 4 | 4 | 4 | 4 | 3 | 3 | 2 | 3 | 2 | 4 | 5 | 5 |
| BaO | 2 | 2 | 2 | 2 | 1 | 1 | | | | | | | 1 | 2 | 2 |
| Note | | | | | | | | | | | | | | | |
| 3α × 10$^{-8}$ | 395.5 | 388.7 | 392.4 | 381.9 | 379.5 | 374.0 | 373.5 | 378.5 | 376.0 | 359.2 | 390.1 | 355.2 | 394.1 | 379.5 | 361.1 |

As can be understood from the above discussion, according to the present invention, since a glass material is sprayed on the metal surface of the roll member, the roll member has an improved durability and anticorrosion, such as water-proof, weather-proof and light-proof, etc., and a high heat resistance and an increased electrical insulation. Furthermore, no foreign matter tends to stick to the outer surface of the roll member. Even if a foreign matter such as dust sticks to the roll surface, the foreign matter can be easily removed.

In addition to the foregoing, due to the composition of the sprayed glass layer, the roll member exhibits a high chemical durability, such as acid-resistance and alkali-resistance, etc., resulting in an increased service life thereof.

Furthermore, according to the manufacturing method of the present invention, since the glass material is directly sprayed on the metal surface of the roll member by a sprayer, the spraying operation can be simply and easily carried out. Finally, upon repairing the roll member, the glass material can be directly resprayed on the portion to be repaired.

I claim:

1. A method for manufacturing a roll member having a metal body which is provided with a glass surface, comprising subjecting the metal body to a blast treatment, preheating the surface of the metal body which has been subjected to a blast treatment to 200° ~ 600° C., forming a stainless steel undercoat layer on the blast treatment surface, plasma spraying a glass material onto the stainless steel undercoat layer to form a glass coating on said undercoat layer, and grinding the sprayed glass surface to form a smooth outer surface after cooling said roll member.

2. A method for manufacturing a roll member having a metal body which is provided with a glass surface, comprising subjecting the metal body to a blast treatment, preheating the surface of the metal body which has been subjected to a blast treatment to 200°~600° C., plasma spraying a glass material onto the surface of the metal body which has been subjected to a blast treatment to form a glass coating in contact with and on said metal body, and grinding the sprayed glass surface to form a smooth outer surface after cooling said roll member.

* * * * *